Patented Dec. 26, 1933

1,940,912

UNITED STATES PATENT OFFICE 1,940,912

TREATMENT OF ORES

William T. Isbell, Bonne Terre, Mo., and George F. Weaton, Beaver, Pa., assignors to St. Joseph Lead Company, New York, N. Y., a corporation of New York No Drawing. Application August 13, 1931
Serial No. 556,942

7 Claims. (Cl. 75—28)

This invention relates to a method for the treatment of zinc ores, particularly of the sulfide type, whereby impurities, such as lead and cadmium, may be effectively and economically eliminated from the ores.

Briefly, the invention comprises subjecting the zinc sulfide ore to an oxidizing roast at a high temperature, that is at 800° C. or over, while the ore is being stirred or otherwise agitated, whereby the lead and/or cadmium contained in the ore is largely eliminated in the form of fume. The preferred form of the invention further comprises separating the fume into portions of relatively coarse and relatively fine particle size and returning the portion of relatively coarse particles to the roasting operation, whereby the separation of the lead and/or cadmium from the zinc is made much more complete.

In the roasting of sulfide ores of zinc, as practiced in the metallurgical art, for the removal of sulfur or oxidizing of the zinc ores, air must be admitted to promote combustion of the sulfur. Velocities of gases created by the combustion are relatively high and to effectively consume the sulfur, the ore must be in a relatively fine state and stirred or rabbled. This combination of a fine ore, relatively high velocities and rabbling results in a large carry-over of ore dusts and fumes which are precipitated out in flues, chambers or other forms of precipitators. As heretofore practiced, the dusts are recovered from the flues and precipitators and added to the roasted ore as discharged from the roaster. In this way all contaminants such as compounds of sulfur, and, as we have discovered, compounds of lead, cadmium, etc., contained in these dusts and once eliminated by the roaster, providing favorable temperature conditions are maintained, are added to the relatively pure and high grade product from the roaster. This procedure has heretofore been necessary due to the necessity of recovering the zinc contained in these dusts which may amount to from 50 lbs. to 200 lbs. of dust per ton of ore fed to the roaster and assay 50% or more zinc from high grade blends.

We have discovered that when roasting is carried on under favorable temperature conditions that these flue dusts contain up to 80% or more of the lead and cadmium in the commercial concentrated sulfide zinciferous ores as fed to the roaster. These flue dusts may be treated, and the values contained therein recovered by hydrometallurgical methods as well known to the arts.

We have further discovered that if these flue dusts are returned to the roasting operation in a dry state, thoroughly mixed with the sulfide zinciferous ores entering the roaster and favorable temperature conditions maintained during the roasting, that the lead and cadmium are volatilized off in a very fine state, probably because of the reaction of the lead and cadmium compounds in the dust with the zinciferous sulfide ores, and do not settle down with the zinc-containing dusts either in the flues, chambers or other forms of dust precipitators unless they be wetted, but that they pass on and may be later recovered by filters or other fume collecting devices well known to the arts; or after scrubbing in such a tower as is customarily used as a part of the gas purification system of a contact sulfuric acid plant or a modification thereof, they may be precipitated by means of mist and wet system electrical precipitators and a high grade concentrate recovered.

Although it is possible to obtain satisfactory results when mixing the dusts with the undried or wet ore fed to the roaster, our preferred practice is to mix the dusts with the entering ore after drying is completed.

It is to be noted that the lead and cadmium compounds from the raw ore or on the first pass will largely settle or precipitate in the flues, dust chambers, dry dust precipitators, and the like, with the zinc or ore dusts. Revolatilizing of these lead and cadmium compounds in the presence of the zinc sulfide ore effects such a reduction in the size of the individual particles that they do not settle or precipitate in the primary dust recovery system with the zinc dusts so that they may be subsequently recovered by other means as a high grade product. Furthermore, as all the zinc-containing dust is returned to the roaster along with the dusts or fumes of the compounds of lead and cadmium, there is no outlet into the subsequent treatment system whereby contaminants may enter, as all ore discharged to this treatment is subject to full time roasting treatment. This has the further beneficial effect of reducing the total sulfur content of the ores passing to subsequent treatment.

The following example illustrates the application of the invention to a particular case:

A zinc sulfide concentrate containing

| | Percent |
|---|---|
| Zinc | 57.2 |
| Lead | 0.955 |
| Iron | 6.6 |
| Cadmium | 0.11 |
| Sulfur | 31.0 | was fed at the rate of about 42 tons a day to a multiple hearth roaster wherein it was thoroughly stirred on each hearth by means of rotating rabbles, and subjected to the oxidizing action of a current of air. The roasting was so carried out that the temperature on some of the hearths exceeded 800° C. For example on the second, third and fourth hearths (from the top) of the roaster temperatures of about 850°, 900° and 850° C., respectively, were maintained.

The roaster was connected by flues to an electrostatic dust precipitator wherein a large proportion of the primary dusts and fumes were precipitated. These dusts, which had the following composition:

| | Percent |
|---|---|
| Zinc | 35.8 |
| Lead | 24.3 |
| Cadmium | 0.54 |
| Sulfur | 2.6 | were returned substantially continuously to the dried concentrate entering the roaster.

From the dry precipitator the gases from the roaster passed through the usual cast iron cooling system and then to a set of lead coolers. Thereafter the gases passed to a scrubbing tower, where they were thoroughly wetted, and thence to a mist precipitator where the fine suspended particles were finally precipitated. The sludge from the latter part of the system was thickened and recovered and showed the following composition:

| | Unwashed | Washed |
|---|---|---|
| | Percent | Percent |
| Zinc | 4.5 | 0.96 |
| Lead | 57.2 | 66.85 |
| Iron | 0.4 | 0.07 |
| Cadmium | 0.55 | 0.15 |
| Sulfur | 11.1 | 10.4 |

The daily production of calcined ore from the roaster was about thirty-five tons. It had the following average analysis:

| | Percent |
|---|---|
| Zinc | 67.2 |
| Lead | 0.143 |
| Iron | 7.5 |
| Cadmium | 0.08 |
| Sulfur | 2.6 |

It will be seen that nearly 90% of the lead and nearly 50% of the cadmium were thus eliminated from the ore, the lead being recovered as a highly concentrated product.

It will be obvious that the process is subject to great variation without departing from the scope of the invention and that the apparatus described above is merely illustrative and may be replaced by any equipment of similar effect. For example, the multiple hearth roaster might be replaced by a rotary tube furnace, and the dry and wet electrostatic separators may be replaced by any equipment capable of effecting a differential separation of the relatively coarse and the relatively fine portions of the dust and fume.

The invention is also applicable to the removal of impurities, such as lead and cadmium, from zinciferous metallurgical materials from whatever source.

For example, it is well known when blast roasting or sintering zinciferous ores on blast roasters or sintering machines such as the well known Dwight & Lloyd machine, that sulfur, lead and/or cadmium and/or other contaminating volatile metals contained in the zinciferous ore are partially eliminated and that the portion so eliminated by blast roasting is caught in part as fume together with the zinc ores and oxides, and deposited along with the zinc ores in the wind boxes and on the grates, from which it drops or is removed. The lead, cadmium, etc., is also concentrated in the sintered layer next the grates which may be shaved off or otherwise separated, all of which is well known to the arts. Treatment of these contaminated zinciferous ores from the blast roasting operation has heretofore consisted of either returning these zinciferous ores contaminated with lead, cadmium, etc., to the head of the blast roaster or sintering machine with the primary feed, or treating these contaminated ores in separate blast roaster or sintering machine, or storing the contaminated material for subsequent periodic batch treatment.

The first process of treatment prohibits the procurement of a high grade ultimate product except at the expense of decreased roaster production due to large amount of ore which must be recirculated, their circulation depending upon the amount of contaminant in the heads, and a considerable increase in roasting costs. The second and third processes are also expensive, requiring duplication of equipment, additional fuel, attendance, etc.

We have discovered that by returning this contaminated zinciferous ore with its concentration of sulfur, lead and/or cadmium and/or other volatile metals, due to blast roasting,—preferably after crushing—to a primary desulfurizing roasting furnace thoroughly mixed with the preferably dry zinc sulfide ores, either entering the roasting furnace or on one of the primary hearths, the lead and/or cadmium and other volatile metallic compounds under favorable temperature are volatilized in a finely divided condition and pass through the usual dry dust flues, chambers, precipitator, and the like, substantially free from zinc, and may be recovered by the means heretofore described.

We claim:

1. A method of eliminating impurities, such as lead and cadmium, from zinc sulfide ore which comprises subjecting the ore to an oxidizing roast at a temperature of above 800° C., differentially separating the dust and fume in the roaster gases into portions of relatively coarse and relatively fine particle size and returning the relatively coarse portion to the roasting operation.

2. A method of eliminating impurities, such as lead and cadmium, from zinc sulfide ore which comprises subjecting the ore to an oxidizing roast under agitation at a temperature of above 800° C., differentially separating the dust and fume in the roaster gases into portions of relatively coarse and relatively fine particle size and returning the relatively coarse portion to the roasting operation.

3. A method of eliminating impurities, such as lead and cadmium, from zinc sulfide ore which comprises subjecting the ore to an oxidizing roast at a temperature of about 900° C., differentially separating the dust and fume in the roaster gases into portions of relatively coarse and relatively fine particle size and returning the relatively coarse portion to the roasting operation.

4. A method of eliminating impurities, such as lead and cadmium, from zinc-containing materials wherein such impurities have been segregated by a prior roasting operation which comprises admixing such segregated materials with unroasted zinc sulfide ore and subjecting the mixture to an oxidizing roast under agitation at a temperature of above 800° C.

5. A method of eliminating impurities, such as lead and cadmium, from zinc-containing materials wherein such impurities have been segregated by a prior roasting operation which comprises admixing such segregated materials with unroasted zinc sulfide ore and subjecting the mixture to an oxidizing roast under agitation under such conditions that the ore is not sintered or agglomerated at a temperature of above 800° C.

6. A method of eliminating impurities, such as lead and cadmium, from zinc-containing materials which comprises admixing said material with zinc sulfide ore and subjecting the mixture to an oxidizing roast at a temperature of above 800° C., differentially separating the dust and fume in the roaster gases into portions of relatively coarse and relatively fine particle size and returning the relatively coarse portion to the roasting operation.

7. A method of eliminating impurities such as lead and cadmium from zinc-containing materials which comprises admixing said material with zinc sulfide ore, subjecting the mixture to an oxidizing roast in a multiple hearth roaster at a temperature of about 900° C., differentially separating the dust and fume in the roaster gases into portions of relatively coarse and relatively fine particle size and returning the relatively coarse portion to an upper hearth of said multiple hearth furnace.

WILLIAM T. ISBELL.
GEORGE F. WEATON.